United States Patent
Schneider et al.

(10) Patent No.: US 10,083,444 B1
(45) Date of Patent: Sep. 25, 2018

(54) BIOMETRIC COMPUTING SYSTEM AND METHOD FOR E-COMMERCE

(75) Inventors: John K. Schneider, Snyder, NY (US); Leonard Pratt, Lockport, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1048 days.

(21) Appl. No.: 13/428,851

(22) Filed: Mar. 23, 2012

Related U.S. Application Data (60) Provisional application No. 61/466,526, filed on Mar. 23, 2011.

(51) Int. Cl.
G06Q 20/40 (2012.01)
G06Q 20/32 (2012.01)

(52) U.S. Cl.
CPC ....... *G06Q 20/40145* (2013.01); *G06Q 20/32* (2013.01)

(58) Field of Classification Search
USPC ..................................................... 705/64, 65
See application file for complete search history.

(56) References Cited

U.S. PATENT DOCUMENTS

| | | | | |
|---|---|---|---|---|
| 5,245,329 A * | 9/1993 | Gokcebay | ..................... | 340/5.33 |
| 5,456,256 A * | 10/1995 | Schneider et al. | ............ | 600/445 |
| 5,647,364 A * | 7/1997 | Schneider et al. | ............ | 600/445 |
| 5,870,723 A * | 2/1999 | Pare et al. | ....................... | 705/39 |
| 5,935,071 A * | 8/1999 | Schneider et al. | ............ | 600/445 |
| 6,012,039 A * | 1/2000 | Hoffman et al. | ........... | 705/14.26 |
| 6,260,024 B1 * | 7/2001 | Shkedy | ........................... | 705/37 |
| 6,296,610 B1 * | 10/2001 | Schneider et al. | ............ | 600/445 |
| 6,334,109 B1 * | 12/2001 | Kanevsky et al. | ......... | 705/14.67 |
| 6,356,888 B1 * | 3/2002 | Egan et al. | .................... | 707/715 |
| 6,539,101 B1 * | 3/2003 | Black | ............................. | 382/124 |
| 6,715,674 B2 * | 4/2004 | Schneider et al. | ............ | 235/382 |
| 7,190,817 B1 * | 3/2007 | Schneider et al. | ............ | 382/126 |
| 7,234,638 B2 * | 6/2007 | Lee et al. | ...................... | 235/380 |
| 7,505,941 B2 * | 3/2009 | Bishop et al. | .................. | 705/67 |
| 7,571,140 B2 * | 8/2009 | Weichert et al. | ............... | 705/40 |
| 7,827,101 B2 * | 11/2010 | Mascavage, III | ............... | 705/39 |
| 7,953,671 B2 * | 5/2011 | Bishop et al. | .................. | 705/67 |
| 8,194,045 B1 * | 6/2012 | Maloney et al. | ............. | 345/173 |
| 8,226,465 B2 * | 7/2012 | Walker et al. | .................. | 463/17 |
| 8,228,299 B1 * | 7/2012 | Maloney et al. | ............. | 345/173 |
| 2003/0108227 A1 * | 6/2003 | Philomin | ........... | G06K 9/00006 382/124 |
| 2004/0117302 A1 * | 6/2004 | Weichert et al. | ............... | 705/40 |
| 2004/0139008 A1 * | 7/2004 | Mascavage, III | ............... | 705/40 |
| 2005/0187883 A1 * | 8/2005 | Bishop et al. | .................. | 705/67 |
| 2006/0157557 A1 * | 7/2006 | Lee et al. | ....................... | 235/380 |
| 2006/0165060 A1 * | 7/2006 | Dua | ........................ | G06Q 20/20 370/352 |
| 2007/0250451 A1 * | 10/2007 | Lee et al. | ......................... | 705/65 |

(Continued)

*Primary Examiner* — John W Hayes
*Assistant Examiner* — Jason B Fenstermacher
(74) *Attorney, Agent, or Firm* — Weaver Austin Villeneuve & Sampson LLP—QUAL (57) ABSTRACT

A system and method for authorizing transactions using biometrics is disclosed. The system may be a commerce authorization system comprising a portable computing device, a docking station, and a biometric reader. The method for authorizing a transaction may comprise the steps of: receiving biometric data from a biometric reader; comparing the received biometric data with a biometric template; and, transmitting payment information to the vendor.

18 Claims, 5 Drawing Sheets

(56) References Cited

U.S. PATENT DOCUMENTS

| | | | |
|---|---|---|---|
| 2007/0258628 A1* | 11/2007 | Schneider et al. | 382/124 |
| 2008/0016002 A1* | 1/2008 | Beenau et al. | 705/64 |
| 2008/0114699 A1* | 5/2008 | Yuan | G06Q 20/0855 705/78 |
| 2009/0064296 A1* | 3/2009 | Aikawa et al. | 726/6 |
| 2009/0119756 A1* | 5/2009 | Acuna et al. | 726/5 |
| 2009/0119757 A1* | 5/2009 | Acuna et al. | 726/5 |
| 2009/0233579 A1* | 9/2009 | Castell et al. | 455/411 |
| 2009/0248579 A1* | 10/2009 | Kaminski et al. | 705/67 |
| 2009/0307139 A1* | 12/2009 | Mardikar | G06Q 20/1085 705/67 |
| 2010/0017333 A1* | 1/2010 | Turgeon | 705/67 |
| 2010/0105462 A1* | 4/2010 | Walker et al. | 463/17 |
| 2010/0151930 A1* | 6/2010 | Oram | 463/17 |
| 2010/0250290 A1* | 9/2010 | Lefkowitz et al. | 705/5 |
| 2011/0047036 A1* | 2/2011 | Foran-Owens et al. | 705/17 |
| 2011/0299744 A1* | 12/2011 | Kountotsis | G06K 9/00013 382/124 |
| 2012/0166810 A1* | 6/2012 | Tao | G06F 21/32 713/186 |
| 2012/0303476 A1* | 11/2012 | Krzyzanowski et al. | 705/26.5 |
| 2017/0163655 A1* | 6/2017 | Ramalingam | H04L 63/107 |

\* cited by examiner

Figure 1

(PRIOR ART)

Figure 2

(PRIOR ART)

Figure 3

| | Traditional System Architecture | Smartphone System Architecture |
|---|---|---|
| Flaw #1 | Optical fingerprint scanner output affected by common contaminants found on the finger or that build up on the fingerprint platen | Ultrasonic fingerprint image quality is not affected by these contaminants |
| | System accuracy diminishes as database size increases through consumer adoption | System accuracy remains constant independent of database size |
| | Performance highly sensitive to user presentation of single finger | 4-finger scanner invariant to user finger placement |
| | Accuracy is sub-optimum due to single finger identification | Accuracy is at the theoretical maximum utilizing all 4 fingers |
| | User required to enter a secondary form of identification in the form of a PIN code | No secondary form of identification is required, only the biometric data |
| Flaw #2 | A UTC (AFIS) processor is needed at each checkout lane | No UTC processor is needed as the smartphone performs all fingerprint match processing |
| Flaw #3 | A Local AFIS is required to support enrollment and match functionality | No Local AFIS is needed as all enrollment and match functionality is handled by the smartphone |
| Flaw #4 | An Enterprise AFIS is required to support multi-store operation | No Enterprise AFIS is required as the consumer carries their biometric template from store to store on the smartphone |
| Flaw #5 | In-store enrollment kiosk required | No in-store enrollment kiosk is required as all enrollment functionality is handled via the smartphone |
| | Consumer data privacy concerns relative to the security of the biometric data stored and maintained by the retailer | No biometric data is stored by the retailer and the consumer maintains full control and ownership of their own biometric data |

BIOMETRIC COMPUTING SYSTEM AND METHOD FOR E-COMMERCE

CROSS-REFERENCE TO RELATED APPLICATION

This application claims the benefit of priority to U.S. provisional patent application No. 61/466,526, filed on Mar. 23, 2011.

FIELD OF THE INVENTION

The present invention relates to a system and method for authorizing transactions using biometrics.

BACKGROUND OF THE INVENTION

From its inception, biometric technology has held the promise of transforming the way society works. One manner in which this may occur is by eliminating token-based identification such as ID cards and credit cards. Numerous system architectures have been developed, and often tried, for various applications ranging from personal security and access control to the purchasing of goods and services in e-commerce transactions. However, to date no commercial biometric application has managed to create both the compelling operational benefits and price/performance ratio necessary to drive consumer demand needed for adoption and long term sustainability in an e-commerce application. Now for the first time, recent technology breakthroughs in biometric performance using ultrasonic fingerprint identification, along with the pervasive and ubiquitous worldwide presence of smartphones, offer the building blocks needed to change the landscape of how e-commerce is conducted.

Biometric system architectures and actual pilot systems have been deployed over a number of years in a variety of e-commerce applications. After years of effort and implementation of operational systems in a number of pilot stores, biometric e-commerce developers failed in their attempts to achieve the price/performance/benefit ratio needed for consumer adoption. A common system architecture developers use is shown in FIG. 1.

Figure 1:
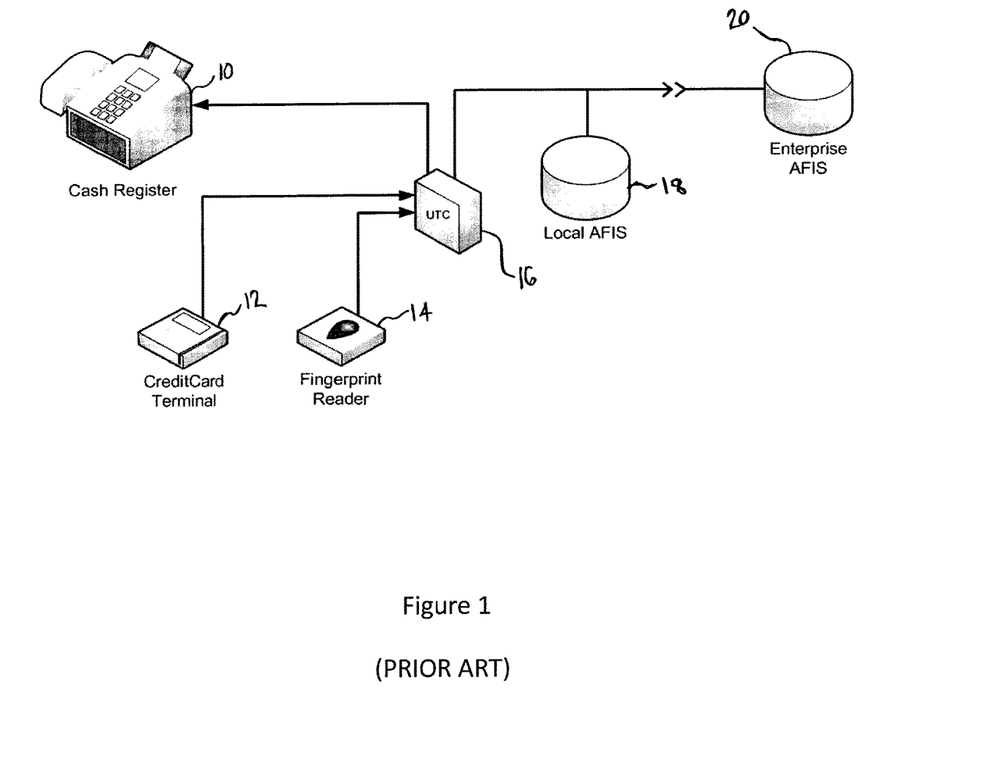
FIG. 1 illustrates a prior art retail checkout system.

FIG. 1 shows a prior art retail checkout lane equipped with a cash register 10 and a credit card swipe terminal 12. A swipe of a credit card sends the ABA (American Banking Association) data contained on the magnetic stripe of the credit card via the network for verification and authorization by third party payment processors. In the prior art, upgrading a checkout lane to support biometric identification required adding a biometric fingerprint reader 14, a UTC (Under the Counter) processor 16, a localized AFIS (Automated Fingerprint Identification System) 18, a centralized AFIS 20, and an enrollment center (not shown).

The prior art system requires a biometric fingerprint reader 14 at each checkout lane for establishing a user's identity. Due to size and cost restrictions, a single-finger fingerprint scanner is utilized. Regardless of the operational mode (identification versus verification), the identification information from a single fingerprint does not provide enough accuracy to facilitate an e-commerce application. Furthermore, human factor issues are heightened with use of a single-finger fingerprint sensor. Specifically, it has been shown repeatedly in a variety of applications that the average user, when placing a single finger onto a fingerprint reader, will have a tendency to roll the finger to the left or right. This creates a situation where fingerprint information from an incorrect portion of the finger may be scanned which can ultimately lead to a false rejection. Careful presentation of the finger a second time, with more attention to finger placement, can overcome this problem but ultimately results in increased processing time at the checkout lane.

A multi-finger (two or more fingers) fingerprint reader not only provides additional biometric data to address system accuracy concerns, but also minimizes the finger presentation issues associated with a single-finger device. For example, it may be very difficult for a user to rotate their entire hand when 4-fingers are lying flat on a fingerprint platen. However, multi-finger optical based fingerprint scanners that are able to image multiple fingers are very expensive and physically large.

Furthermore, the biometric industry recognizes the sensitivity of optical scanners. Contamination that builds up on fingers or on the platen, low humidity, high humidity, exposure to sunlight, and other factors may significantly impact the ability of an optical scanner to obtain a high quality fingerprint image. Thus, independent of the number of fingers an optical sensor is able to scan, the prior art system often obtains compromised images causing the identification attempt to fail.

In an example of the prior art, a single board computer with enough processing power to perform the feature extraction and match functions was placed at each checkout counter (i.e. an AFIS in a box). This was primarily due to the fact that the large volumes of data associated with the raw fingerprint image, the available bandwidth of a network communication link, and the processing power needed by a single server to simultaneously process fingerprint data from the 30+ checkout lanes seen in some larger supermarkets, was unmanageable. The UTC's were expensive, prone to hardware failure, and required obligatory updates on a regular basis.

Stores implementing biometric payment systems required the addition of an AFIS into their information-technology ("IT") infrastructure. The AFIS was necessary for storing the biometric templates at the time of enrollment, along with the credit and loyalty card information for each consumer. At the point of sale, a consumer would be asked to enter a non-unique PIN code (typically a birth date) which was sent to the AFIS. The AFIS would retrieve the candidate list of all biometric templates associated with that birth date and pass those templates to the UTC for subsequent match identification. In addition to the expense of adding another server to the store's IT infrastructure, also added was the responsibility of supporting and maintaining a new process within the store, which was not a familiar task for a retail merchant.

In addition to localized store AFIS servers 18, a centralized enterprise AFIS 20 was located at some location such as corporate headquarters. The purpose of the enterprise AFIS 20 was to enable a patron to enroll at one store and seamlessly use the technology at another store in a different location. This was done by synchronizing the enrollment data amongst individual stores via a central enterprise AFIS 20. The expense in both hard and soft costs associated with implementing a centralized AFIS 20 at an IT datacenter represented added cost and complexity that was difficult for most retailers to implement.

Although not shown in FIG. 1, a second element may be associated with e-commerce biometric applications; specifically, how to initially enroll into the system a consumer, and his/her credit cards authorized for e-payment. This enrollment process was generally accomplished at a kiosk located at the front of the store. The kiosk was staffed by individuals ready to assist the consumer on the use and benefits of a biometrically authenticated payment system, as well as answer any questions they had. The equipment at the kiosk was essentially everything that was at a checkout lane, with the exception of the cash register. This created significant additional expense, and occupied scarce, high-value floor space in the front of each store. More significantly however, this arrangement generally led to discovery conversations with the consumer, the most important being "Where is my biometric data being stored, how secure is it, and who has access to it?" While the answers to these questions were well thought out, the average consumer was often left with an uneasy feeling about the answers.

The inherent flaws in the prior art system architecture are numerous and can be summarized as: High per/lane hardware costs; High support and maintenance costs; Poor biometric system performance; Compromise of the consumer convenience factor due to the required use of a PIN; and Consumer concerns over data privacy.

All of these factors together resulted in the price/performance/benefit ratio failing to meet that which is required for vendor and consumer adoption, and long term sustainability. Consumer demand remains high as evidenced by many industry studies, but the prior art is unable to satisfy that demand.

SUMMARY OF THE INVENTION

The invention provides a system and method for authorizing transactions using biometrics. The invention may be embodied as a commerce authorization system, comprising a portable computing device of a purchaser and a biometric reader of a vendor. The biometric reader may be capable of executing a scanning operation using ultrasound to scan an object, such as a finger.

The portable computing device may store a software payment application within the device's memory as well as biometric information, such as a biometric reference template. In one embodiment of the invention, the portable computing device is a smartphone.

In one embodiment, the invention further comprises a docking station which may provide for data transfer to and from the portable computing device. For example, the data may be transferred using the docking station to a vendor's check-out system. The biometric reader may be in communication with the docking station. The biometric reader may use ultrasound to scan an object such as a fingerprint. The docking station may include a shelf to assist in aligning the computing device with the reader for data transfer.

The payment application may accept biometric inquiry information derived by a scanning operation executed by the reader, and determine whether the accepted biometric inquiry information matches the biometric reference information. The payment application may be a software program that is executable by a microprocessor residing on the portable computing device. Upon determining that the accepted inquiry information was obtained from the same object as the reference information, the software payment application may transmit account information identifying an account from which payment can be made to a vendor.

The invention may also be embodied as a method for authorizing a transaction comprising the steps of: receiving biometric inquiry information derived by a scanning operation executed by a vendor's biometric reader; transmitting the inquiry information to a purchaser's portable computing device; using the computing device to compare the received inquiry information with biometric reference information stored on the portable computing device; and, if a match is determined, authorizing a transaction by transmitting payment information to the merchant. The payment information may be credit or debit account information sent from the purchaser's portable computing device. In one embodiment, the method may include the step of receiving a unique merchant identification code from a merchant.

The received inquiry information may be encrypted. In one embodiment, the method may further include the step of decrypting the inquiry information. In another embodiment, the method may include the step of connecting the purchaser's computing device to the vendor's biometric reader. The purchaser's computing device and the reader may communicate with each other wirelessly. In one embodiment, the computing device is aligned with the biometric reader to allow line-of-sight communication. The purchaser's computing device may be a smartphone.

In another embodiment, the method may further comprise the step of transmitting supplemental purchase data. Such data may include discount information and coupons, or purchase history and loyalty card data.

Other features of the invention can be found in the following description, the enclosed claims and/or the attached drawings.

BRIEF DESCRIPTION OF THE DRAWINGS

For a fuller understanding of the nature and objects of the invention, reference should be made to the accompanying drawings and the subsequent description. Briefly, the drawings are:

FIG. 4 is a chart illustrating the differences between traditional system architecture and a smartphone system architecture in keeping with the invention; and, FIG. 5 is a flowchart illustrating a method for authorizing a transaction in keeping with the invention.

FURTHER DESCRIPTION OF THE INVENTION

The present invention may be described with reference to a commerce authorization system, and a method for authorizing a transaction.

Biometric identification systems operate on similar principles regardless of the type of biometric measurement (face, fingerprint, iris, other) or the particular vendor of the identification system. For illustrative purposes, the examples that follow will focus on the most widely used and widely accepted biometric, the fingerprint, with the understanding that the same concepts are easily extendable to other biometric measurements, and that other types of biometrics may be used in the present invention.

Figure 2:
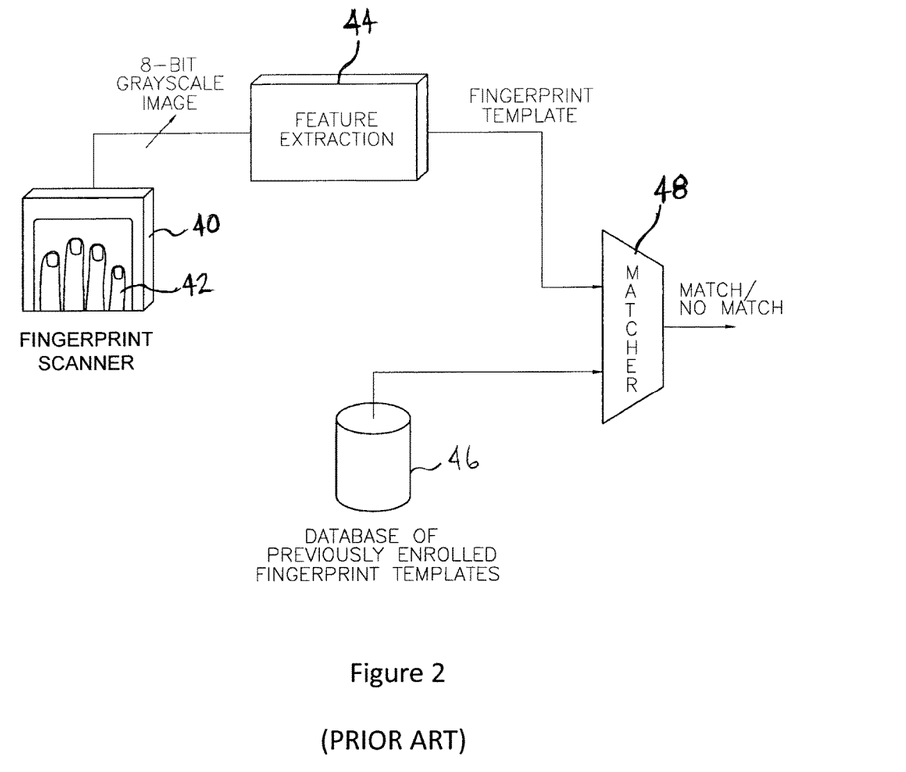
FIG. 2 is a block diagram illustrating how a prior art fingerprint identification system operates.

A block diagram of how a prior art fingerprint identification system operates is given in FIG. 2. A single finger or multiple fingers are imaged using a live-scan fingerprint capture device 40 to produce biometric data corresponding to the finger(s) 42. Generally, the biometric data is transmitted unencrypted to a local client workstation 44. After compression, the biometric data may be packaged with other demographic or identifying data (such as that contained on a driver's license or other credential), the data may be encrypted and then sent to a central server 48 for further processing. Quite often, the central server 48 is an AFIS. The AFIS is responsible for comparing biometric data obtained from the live-scan capture device to previously obtained biometric data that is stored in a database, and determining whether a match exists.

An early step in AFIS processing includes creating a biometric template through a process known as "feature extraction". The image of a biometric sample, such as a fingerprint, is not used in comparing one fingerprint to another. Rather, a significantly smaller "feature map" or template of the fingerprint, having the unique identifying minutiae points of the finger, is used. Matching one template to another is often a function of the AFIS. The template created from processing the live biometric sample is referred to as the "Inquiry template." To determine a match, the Inquiry template is compared to a Reference template, which can be contained on a secure identification document, or can reside internal to the AFIS as a result of a prior enrollment process.

Thus, at the most fundamental level, the processing involved in fingerprint identification normally includes three steps: (1) Biometric Sample Acquisition; (2) Feature Extraction/Template Generation; and (3) Matching.

There are two primary modes of operation with biometric systems; identification and verification. The main source of confusion for end users regarding biometric technology often stems from the lack of understanding regarding the differences between these two modes of operation. Furthermore, the operational goals of identification and verification are different and have competing outcomes of user convenience versus identification accuracy or security.

Biometric identification is the process by which an individual is identified based on the presentation of a biometric sample. If no token, such as a Personal Identification Number ("PIN") or Identification ("ID") card, is used, the accuracy of the system is highly dependent on the accuracy of the biometric system. In the case of a fingerprint-based system, the user presents their finger or fingers for scanning, the system performs feature extraction and uses the resulting template (the "inquiry" template) to determine whether there is a match with a template (the "reference" template) stored in a database 46 of possible candidates. As the number of people in the database 46 rises, the likelihood of a misidentification (false match) also rises.

Thus, system performance is very much tied to the size of the database 46. A system configuration that provides acceptable performance today may not provide those same results tomorrow as the number of individuals in the database grows. Thus, scaling to accommodate consumer adoption becomes a real concern with systems that are architected for identification. Adding more biometric samples for each person (i.e. scanning more than one finger from each person) significantly mitigates this problem, but does not solve all of the performance problems associated with current fingerprint systems, including those that are based on optical technology.

Thus, an advantage of biometric identification lies in the perceived simplicity to the end user. With no ID cards or PINs to remember, the benefits of tokenless identification can be realized. The user simply walks up, places their finger onto the fingerprint platen, and an accurate identification takes place. Credible performance statistics for single-finger systems architected in this manner have been difficult to obtain, but accuracy rates in the 80-85% range for single-finger based identification architectures are typically reported. Thus, a user wishing to utilize the benefits of biometric technology for e-commerce transactions open themselves up to a 15% error rate associated with transactions, including incorrect charges against their account due to false matches, or the inability to complete the transaction due to the system being unable to correctly match their finger as a result of a false rejection.

The elimination of false matches is relatively straightforward and involves the second mode of operation known as verification. Here, the user not only presents "something they are" for purposes of identification (the biometric sample), but also presents a second piece of data in the form of "something they have" (an ID card), or "something they know" (a PIN). This two factor form of identification virtually eliminates the possibility of any types of false acceptances from occurring by utilizing one-to-one verification of a person's identity as opposed to a one-to-many identification as previously explained. While this mode is very secure, the user quickly realizes that, in fact, there is no real convenience in utilizing biometric identification given that all of the steps currently necessary to complete an e-commerce transaction (e.g. present a credit card) are still required, and in addition they must now present a biometric (e.g. scan a finger) as well. Thus, adding security creates a system that is less convenient and user adoption quickly declines.

Thus, an improved biometric system combines the efficiency of tokenless identification with the accuracy and security of verification. These are competing requirements and, up until now, no biometric system has been able to demonstrate its ability to achieve an acceptable balance between system accuracy and user convenience.

A superior implementation architecture, which may be used for e-commerce applications, may be achieved using the present invention. In one embodiment of the invention, ultrasonic biometric scanners and a portable communication device, such as a smartphone, are used.

Ultrasonic fingerprint identification has been utilized in a variety of applications for the past decade. The ability of ultrasound to generate improved image quality, almost independent of the contamination found on the finger or that which builds up on the fingerprint platen, has resulted in demonstrable improvement in system accuracy rates associated with non-attended (e.g. commercial) applications. Furthermore, recent advances have made the development of a low cost, low profile, solid state multiple-finger scanner a reality. A fingerprint scanner may utilize the superiority of ultrasound (as opposed to optics) for imaging the finger, provide the accuracy associated with scanning multiple-fingers as opposed to a single finger, and be produced at a price point that competes with single finger scanners.

Also, the multiple-finger ultrasonic fingerprint scanners can be scaled to enable secured access as well as device navigation on a smartphone. Thus, the present invention may be implemented in a manner that achieves a secure e-commerce transaction.

The introduction and mass adoption of smartphones by the consumer is pervasive throughout society. With this comes technology improvements, including processors able to run at processing speeds well in excess of 1 Ghz. As such, we now have portable communication devices that are more than capable of efficiently handling the processing associated with biometric identification, and in particular the feature extraction and matching functionality.

Figure 3:
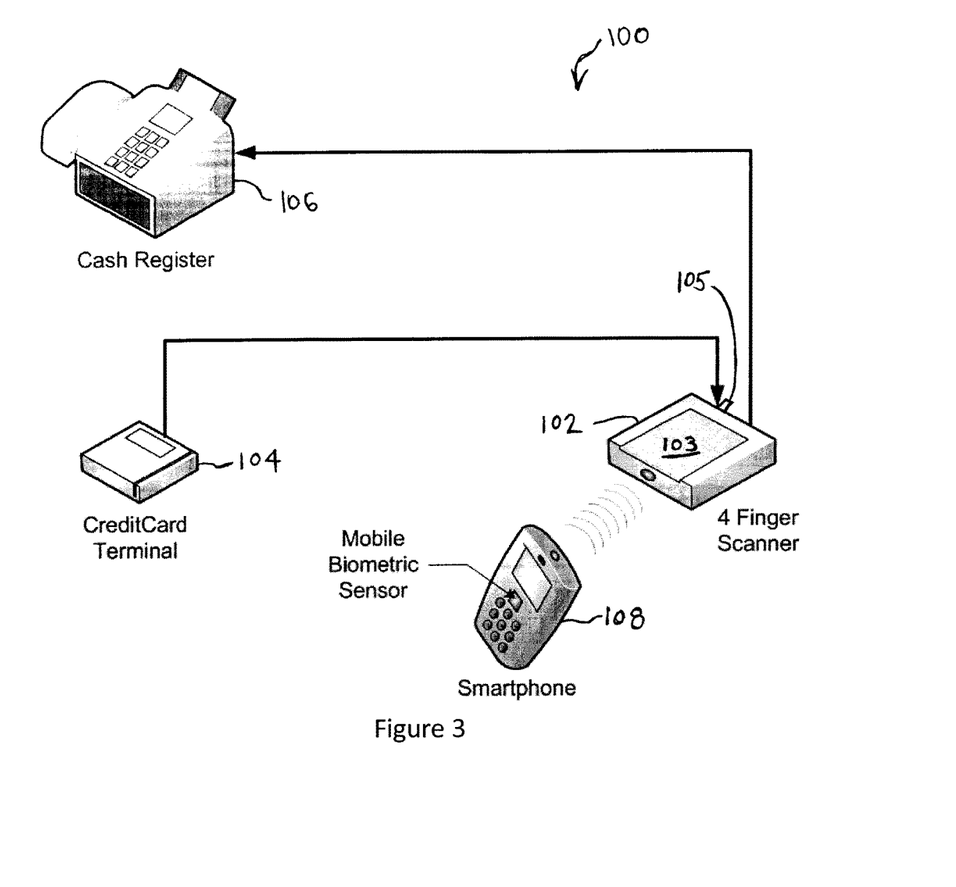
FIG. 3 illustrates a system architecture for retail checkout lanes in keeping with the invention.

With the advent of solid state ultrasonic multiple-finger capture technology and the processing power associated with smartphones, a system architecture 100 for retail e-commerce applications can be implemented. FIG. 3 shows such a system. This new platform architecture 100 avoids shortcomings of prior art implementation strategies. In this particular embodiment, the single hardware/software component necessary to support this architecture at an individual checkout lane is a multiple-finger ultrasonic fingerprint scanner 102 having two inbound communication links. Further explanation regarding key attributes of this device will help in understanding implementation and benefits associated with such a system.

A multiple-finger ultrasonic fingerprint scanner 102 for retail e-commerce applications may be used to implement the invention. Such a scanner 102 may include the following functionality: A multiple-finger ultrasonic fingerprint sensor 103, an ABA compatible credit card swipe reader communications port 105, and a communications link, such as an IRDA (Infrared Data Association) or other wireless communication link. Utilizing the superior technology of ultrasound, coupled with the ability to image multiple-fingers simultaneously, a system according to the invention is able to provide the system accuracy needed for a high volume consumer application. Issues such as failure-to-enroll, false-acceptance, false-rejection and finger placement, which are commonly associated with single-finger optical scanners, may be virtually eliminated.

As part of an implementation strategy, the biometric scanner may need to support the communication protocol, both hardware and software, needed to interface to common credit card terminals 104. In most cases, this is nothing more than supporting a USB communication protocol, but in the case of older terminals, communication protocols such as RS232 or RS485 have also been used. The concept is that not all consumers will initially adopt the use of biometric technology and so there may be a need to support the use of traditional credit cards. Supporting this capability inherently within the fingerprint scanner 102 makes implementation seamless for the retailer. Specifically, the credit card terminal 104 is cabled into the fingerprint scanner 102, and the output of the scanner is cabled into the cash register 106. A consumer not wishing to utilize biometric technology simply swipes their credit card, and the credit card information flows unmodified via the fingerprint scanner 102 and on to the cash register 106 where traditional payment processing and authorization takes place.

An IRDA link may be used as the communication link between the fingerprint scanner 102 and the smartphone 108. Other wireless links are certainly possible, with advantages and disadvantages associated with each. Some of the potential advantages associated with an IRDA link are low cost and line of sight detection, thus minimizing unauthorized wireless detection of transmissions.

Regardless of wireless implementation strategy, the process flow for biometric e-payment may consist of the following steps (also shown in FIG. 5), which may be controllable from a software application running on the smartphone (108 of FIG. 3) and managed by the consumer. Initially, the items to be purchased may be identified, for example by scanning bar codes on the items in a known manner. A total purchase amount may then be displayed on a monitor or other display device. The consumer, knowing they wish to make this purchase via biometric authorization, causes a payment software application to be initialized on the smartphone (step 201). Startup could be made easy through the use of a single speed-dial character to launch the application once access to the smartphone is granted, which may be accomplished via a biometric reader on the smartphone. The smartphone may be aligned on a shelf or other physical structure (not shown) built into the vendor's fingerprint scanner. This shelf serves two purposes. First, it functions as both a convenient place to hold the smartphone during data transfer and, second, as an optical shield for the IRDA link to prevent unauthorized reception of transmitted data. In order to provide additional security, transmitted data may be encrypted.

Figure 5:
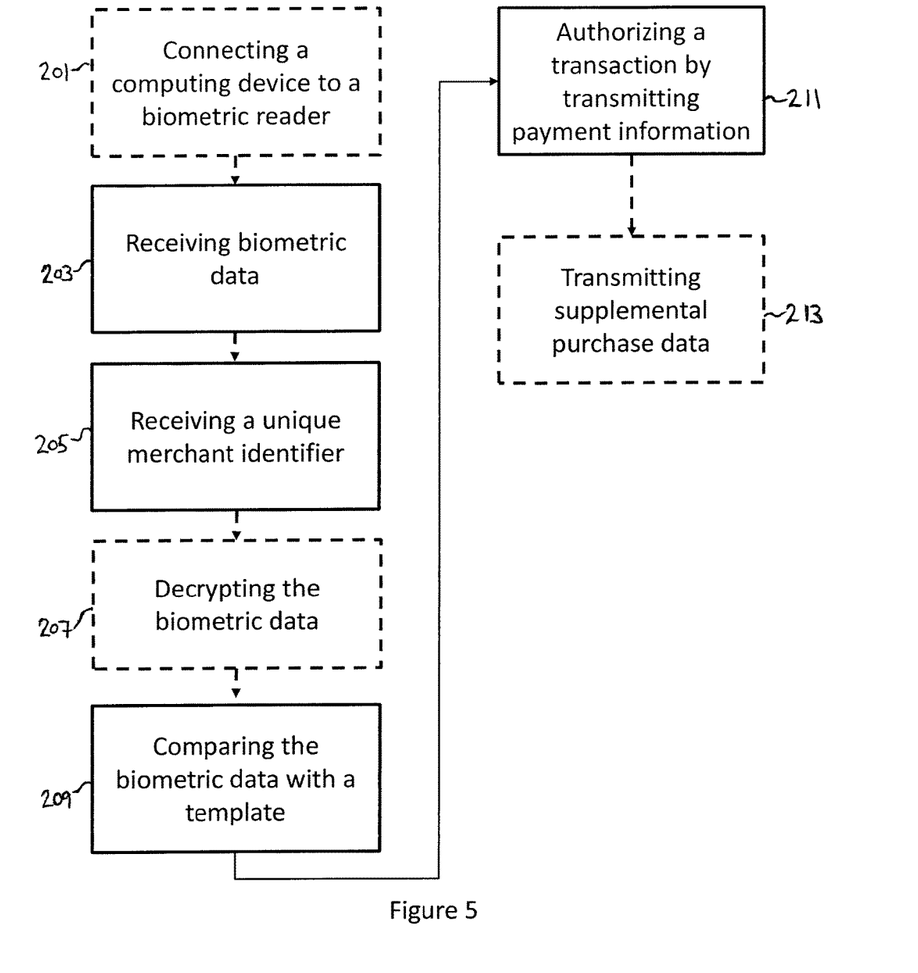

The smartphone may receive (step 203) fingerprint data from the vendor's scanner along with a unique merchant identification code (step 205). The data may be decrypted (step 207) and the smartphone may match (step 209) the inquiry template from the newly scanned fingerprint image to a previously stored fingerprint template (sometimes referred to as the "reference template"). Hence, a one-to-one verification is taking place without the intrusiveness associated with the consumer needing to present PIN codes or ID cards.

If the application running on the purchaser's smartphone determines there is a sufficient match between the inquiry template and the reference template, the application determines that a successful biometric verification has occurred, transmits the consumer's payment account information (step 211), which was previously stored on the smartphone, via the IRDA link. Other transactional information such as loyalty cards and coupons can also be stored on the smartphone and transmitted at this time (step 213). The payment account information that the consumer has identified to be used for this purchase is passed from the smartphone to the merchant's payment system, and the transaction may then be completed as if a 'normal' card swipe has taken place. In an embodiment of the invention, the smartphone substitutes as a payment card. It is expected that the consumer will make purchases at many different stores. The use of a unique merchant identification code allows a credit or payment transaction agency to associate a purchase, cost, user, and a specific store with a specific financial transaction.

As is readily seen, significant improvements to the process flow as well as reductions in hardware at each checkout lane are now possible with the introduction of a multiple-finger ultrasonic scanner, a smartphone in communication with the ultrasonic scanner, and an application operating on the smartphone. It will be recognized that the invention achieves an additional improvement relative to implementation. Specifically, the smartphone software application can be configured in advance, by the consumer, with the consumer's payment account information. For example, the very first biometric transaction utilizing a multiple-finger fingerprint scan can be utilized as an enrollment image. The image template can be generated, stored on the smartphone, and the appropriate, previously configured, payment account information selected. Thus, the enrollment process is seamless and requires no special in-store instructions, processes, hardware, software or attendant support.

FIG. 4 identifies various implementation flaws of conventional system architecture, along with how those flaws are eliminated by the invention when a smartphone system architecture is used.

User adoption of e-commerce technology has historically been driven by convenience and security. Once this technology becomes pervasive, the consumer will no longer need to carry the myriad of loyalty cards and credit cards that they are accustomed to carrying today. The convenience of paying with the touch of a finger has already been embraced by the consumer.

There remains a question about security. The typical question that would be anticipated is "What if I lose my smartphone?" A brief look at system security quickly reveals that the invention is more secure than a credit card contained in a physical wallet or purse. The first line of defense lies in the fact that access to the smartphone can be biometrically enabled. In such a system, getting access to the e-payment application on the smartphone is impossible without going through fingerprint verification on the phone itself. Should a consumer lose possession of their phone, the thief would have to circumvent the biometric identification requirement in order to gain access to the e-payment application.

Assuming this did in fact occur, the (encrypted) multi-finger reference template that is contained on the phone corresponds to the owner of the phone. Unlike present day credit card purchases which can be made virtually by anyone presenting a card to a retailer, this payment account information (which also may be encrypted), which enables the purchase of merchandise, would only be released to the retailer in the event a multi-finger fingerprint match occurred. Since the thief's fingerprints will not match that of the phone's owner, a second form of biometric authentication would have to be defeated in order for an unauthorized purchase to be approved. Thus, as a minimum and without introducing other forms of PIN codes or safeguards, the system can be implemented to have a built-in two-factor biometric authentication safeguard that would have to be defeated for an unauthorized credit purchase to take place.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A system comprising:
    an apparatus including a biometric reader and a communication link, the biometric reader being associated with a first party and configured to obtain biometric inquiry information from a second party; and
    a portable computing device of the second party, the portable computing device having a software payment application and biometric reference information of the second party stored thereon, wherein:
        the biometric reader is configured to be communicatively coupled, by way of the communications link, with the portable computing device and to transmit, to the portable computing device, identifying information of the first party and the biometric inquiry information;
        the software payment application is configured to (i) determine whether the biometric inquiry information matches the biometric reference information of the second party; and, (ii) upon determining that the biometric inquiry information matches the biometric reference information, transmit, using the identifying information of the first party, account information of the second party to the biometric reader; and
        the biometric reader is configured to receive the account information from the portable computing device of the second party and to use the received account information to authorize a financial transaction between the first party and the second party.

2. The apparatus of claim 1, wherein the portable computing device is a smartphone.

3. The apparatus of claim 1, further comprising a docking station providing for data transfer from the portable computing device.

4. The apparatus of claim 3, wherein the docking station includes a shelf.

5. The apparatus of claim 1, wherein the biometric reader is capable of executing a scanning operation using ultrasound to scan an object, and wherein the collected biometric information is derived from the scanning operation.

6. The apparatus of claim 1, wherein the biometric reader is a multiple finger ultrasonic fingerprint scanner configured for use by a retail merchant.

7. The apparatus of claim 5, wherein the biometric reader is a multiple finger ultrasonic fingerprint scanner configured for use by a retail merchant.

8. The apparatus of claim 7, wherein the identifying information is a unique identification code associated with the merchant.

9. A method for authorizing a transaction comprising the steps of:
    obtaining, with a biometric reader, biometric inquiry information from a second party, the biometric reader being associated with a first party;
    transmitting identifying information of the first party and the biometric inquiry information to a portable computing device of the second party, the portable computing device having a software payment application and biometric reference information of the second party stored thereon;
    determining, with the software payment application, whether the biometric inquiry information matches the biometric reference information and upon determining that the biometric inquiry information matches the biometric reference information, transmitting, using the identifying information of the first party, account information of the second party from the portable computing device to the biometric reader;
    receiving the account information from the portable computing device of the second party; and
    using the received account information to authorize a financial transaction between the first party and the second party.

10. The method of claim 9, wherein the received collected biometric information is encrypted.

11. The method of claim 9, wherein the first party is a vendor and the second party is a purchaser.

12. The method of claim 9, wherein the portable computing device is a smartphone.

13. The method of claim 9, further comprising the step of transmitting supplemental purchase data.

14. The method of claim 13, wherein the supplemental purchase data is discount information.

15. The method of claim 13, wherein the supplemental purchase data is purchase history information.

16. The method of claim 9, wherein the account information is transmitted from the portable computing device.

17. The method of claim 9, wherein the biometric reader is a multiple finger ultrasonic fingerprint scanner configured for use by a retail merchant.

18. The method of claim 17, wherein the identifying information is a unique identification code associated with the merchant.

* * * * *